United States Patent [19]
Elliott

[11] Patent Number: 5,927,006
[45] Date of Patent: *Jul. 27, 1999

[54] READY ROOTS

[76] Inventor: Stephen C. Elliott, P.O. Box 506, Ft. Ogden, Fla. 33842

[*] Notice: This patent is subject to a terminal disclaimer.

[21] Appl. No.: 08/868,374

[22] Filed: Jun. 3, 1997

Related U.S. Application Data

[60] Provisional application No. 60/036,140, Jan. 21, 1997.

[51] Int. Cl.⁶ ..................................................... A01G 31/00
[52] U.S. Cl. ................................................. 47/59; 47/65.8
[58] Field of Search ............................... 47/59, 64, 65.5, 47/65.8

[56] References Cited

U.S. PATENT DOCUMENTS 5,081,791   1/1992   Baron et al. ................................. 47/59

FOREIGN PATENT DOCUMENTS 0365096   4/1990   European Pat. Off. ................... 47/59
2615689   12/1988  France ........................................ 47/59
2260113   6/1974   Germany ..................................... 47/59
2177829   7/1990   Japan .......................................... 47/59
9400004   1/1994   WIPO ......................................... 47/59

*Primary Examiner*—Michael J. Carone
*Assistant Examiner*—Joanne C. Downs
*Attorney, Agent, or Firm*—Frank A. Lukasik

[57] ABSTRACT

The invention relates to a potting media and an aquatic grow system using soil-less potting media. The soil-less media consists of ground, double cell, walled reticulated foam, from the polyurethane family, polyester class. The foam is ground and placed in a one quart poly grow-bag having a series of small holes punched around the periphery, slightly above the bottom of the bag. An aquatic plant is then placed in the bag of ground foam mixture media and filled with water until the foam is fully soaked and will not float. The filled bag is then placed in the intended water environment to grow. Prior to shipping, the grow-bag is gently squeezed to reduce weight by 99% to reduce the weight for shipping. The media remains moist during shipping to keep roots and plant healthy.

4 Claims, 1 Drawing Sheet

READY ROOTS

RELATED APPLICATIONS

This application is a Continuation-In-Part of ser. No. 60/036,140 filed Jan. 21, 1997.

BACKGROUND OF THE INVENTION

1. Field of the Invention

This invention relates to a potting media and more particularly to aquatic grow systems and soil-less potting media.

2. Description of the Prior Art

The prior art methods of growing and shipping aquatic plants consists of growing the plants in natural soil. The plant is then pulled out of the natural growing environment, and the bare roots are wrapped in newspaper or other absorbent wrapping medium. The plant is packaged and shipped to the customer. Shipping aquatic plants by pulling the roots out of the soil, shocks the plant which then requires five to six weeks to recover. Plants shipped north, with a very short growing season, have barely enough recovery time to be appreciated in bloom.

One prior art method of growing plants is disclosed by U.S. Pat. No. 1,994,962 to Rushfeldt which discloses a plant package and a method of making the package. An envelope made from a rubber compound, is open at one end. A reinforcing strip of unvulcanized rubber is adhered to the open end. A ball of material is enclosed in a protective covering of relatively stiff material and the envelope is placed around the exterior. A heavy paper or cardboard may be wrapped around an absorbent material which may be a ball of natural soil, moss, or other suitable moisture absorbing material about the roots.

British Patent No. 693,069 to Harris discloses a storable and vendable product container charged with a compact mass of culture medium in a dry loose state having seeds sown and retained therein in positions suitable for germination as soon as the medium is moistened. The container is made from a waterproof material both for the purpose of maintaining the contents in a dry condition prior to germination, and of retaining moisture introduced into the package when it is desired to germinate the seed.

SUMMARY OF THE INVENTION

In accordance with the invention, there is provided a state-of-the-art system uniquely suited for the growing of aquatic plants. The soil-less media consists of ground double cell, walled reticulated foam, from the polyurethane family, polyester class. The ground foam is placed in a one quart poly grow-bag having a series of small holes punched thereinaround the periphery, slightly above the bottom of the bag. An aquatic plant is then placed in the bag of ground foam mixture media and filled with water until the foam is fully soaked and will not float. The filled bag is then placed in the intended water environment to grow. The soil-less media absorbs water like a sponge. Prior to shipping, the grow-bag is gently squeezed to reduce weight by 99%. The media remains moist during shipping to keep roots and plant healthy.

Clean, soil-less media, means no risk of introducing aeromonas and pseudomones bacteria into a pond. The invention produces giant marginal plants with robust root systems. Water lilies arrive in bloom and continue to bloom with virtually no transplant shock. These rootbound plants explode with new growth when stepped up to one or three gallon containers. The ready roots product of the invention is 100% fish safe. Plants grown with the media of the invention, are no more costly than bareroot, oasis, or rock wool plants and the plants are much larger. Ready roots soil-less media is available in bulk, (bales) for growers with or without grow-bags. The media handles just like soil but is completely clean. There are no holes to cut, and no cubes to break. Ready roots plants can be re-potted into larger containers using conventional soil as well.

It is therefore an object of the invention to provide an improved aquatic growth system and soil-less potting media.

It is another object of the invention to enhance the rooting of aquatic plants and to reduce the weight of shipping aquatic plants.

A still further object of the invention is to provide a potting media consisting of a ground foam from the polyurethane family, polyester class.

Yet another object of the invention is to provide potting media consisting of waste material from cutting double cell walled reticulated foam.

BRIEF DESCRIPTION OF THE DRAWING

The FIGURE is a side sectional view of a poly grow-bag containing the potting media of the invention and a rooted aquatic plant.

DESCRIPTION OF THE PREFERRED EMBODIMENTS

Figure 1:
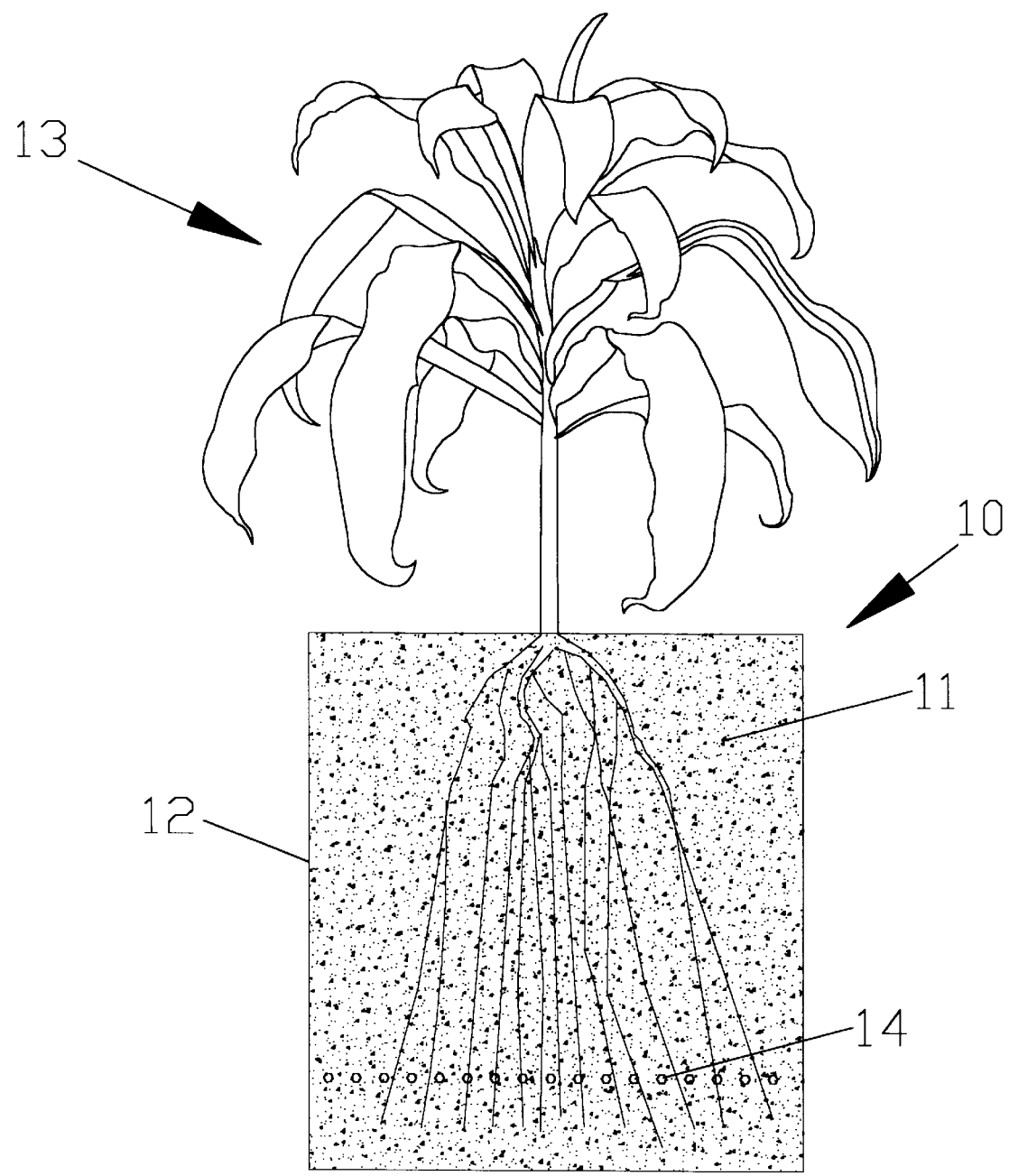

The potting media consists primarily of a ground, double cell, walled reticulated foam, from the polyurethane family, polyester class. In a preferred embodiment, the potting media of the invention was produced during the process of cutting large foam blocks into long, slim strips. The foam material resulting from the cutting process varies in size from the size of a grain of salt and up to small strips of foam up to an inch long. As shown in the figure, the ready roots system of the invention is denoted by the numeral 10. The ready roots system consists of packing the ground foam 11 into a plastic bag 12. The plastic bag 12, which may be black, has a series of small holes punched therein around the periphery, slightly above the bottom of the bag 12. An aquatic plant 13 is then placed in the bag 12 of ground foam 11, and the bag 12 is filled with water until the foam 11 is fully soaked and will not float. The filled bag 12 is then placed in the intended water environment. Holes 14 provide water flow when the plant is in the water, and drainage when squeezing out the water.

EXAMPLE 1

The ready roots system was packed in a one quart poly grow-bag, an aquatic plant is then placed in the bag of ground product, filled with water and inserted in a natural growing environment in a pond. It produced aquatic plants of outstanding quality in a short time. The rooted plant was then squeezed, and the water removed, to reduce the weight for shipping.

EXAMPLE 2

The ready roots system was mixed with 15-11-13 osmocote at the rate of 5 grams (1 teaspoonful) per gallon of product and was packed in a one quart poly grow-bag, an aquatic plant was then placed in the bag of ground product, filled with water and inserted in a natural growing environment in a pond. It produced aquatic plants of outstanding quality in a shorter time than the product alone. Other slow-release fertilizer may also be used for the same results.

EXAMPLE 3

The ready roots system was mixed with Canadian Peat Moss at varying rates per gallon of product and was packed in a one quart poly grow-bag, an aquatic plant was then placed in the bag of ground product, filled with water and inserted in a natural growing environment in a pond. It produced aquatic plants of outstanding quality in a shorter time than the product alone.

Although but three embodiments of the ready roots system have been described, it will be obvious that other sizes and shapes may be used and other fertilizers or additives may be added. The ground, double cell, walled reticulated foam, from the polyurethane family, polyester class product of the invention with its unique qualities of absorption and retention of liquids provides an ideal potting soil where weight is a factor. The very small size of the majority of the particles of ground foam, (the size of sawdust) provide the benefit of a close packed body with very small voids between the particles thereby providing the density of soil, with the water absorption qualities of foam. A solid foam block of the same material would not permit penetration of the roots into the block and would not serve the purpose of potting soil.

The invention may be embodied in other specific forms without departing from the spirit or essential characteristics. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A potting media for enhancing the rooting of aquatic and terrestrial plants, and for reducing the weight of shipping aquatic plants, said media consisting of ground double cell, walled reticulated foam, from the polyurethane family, polyester class, said media being produced in varying sizes by cutting large foam blocks and collecting the ground foam cuttings in a range from the size of a grain of sawdust and up to and including strips of foam up to an inch long, said media being mixed with peat moss in varying rates per gallon.

2. The potting media of claim 1 wherein said potting media is mixed with a slow release fertilizer at the rate of 5 grams per gallon of media.

3. The combination of an aquatic or terrestrial growth system and a potting media consisting of:

a poly grow bag having a top opening, a bottom, and a plurality of holes formed therein, said holes being formed around the entire circumference of said bag and near said bottom, and, a potting media consisting of ground, double cell, walled reticulated foam from the polyurethane family, polyester class, mixed with potting soil in varying rates per gallon, and mixed with a slow release fertilizer, said media packed in said poly grow bag, said media being produced in varying sizes by cutting large foam blocks and collecting the ground foam cuttings in a range from the size of a grain of sawdust and up to and including strips of foam up to an inch long.

4. The combination of claim 3 wherein said slow release fertilizer is 15-11-13 osmocote.

* * * * *